UNITED STATES PATENT OFFICE.

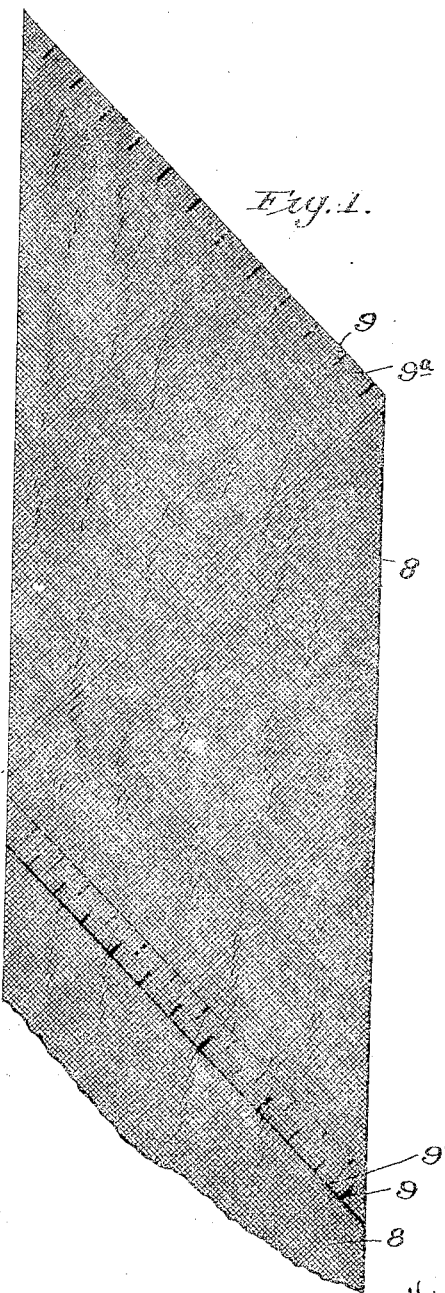

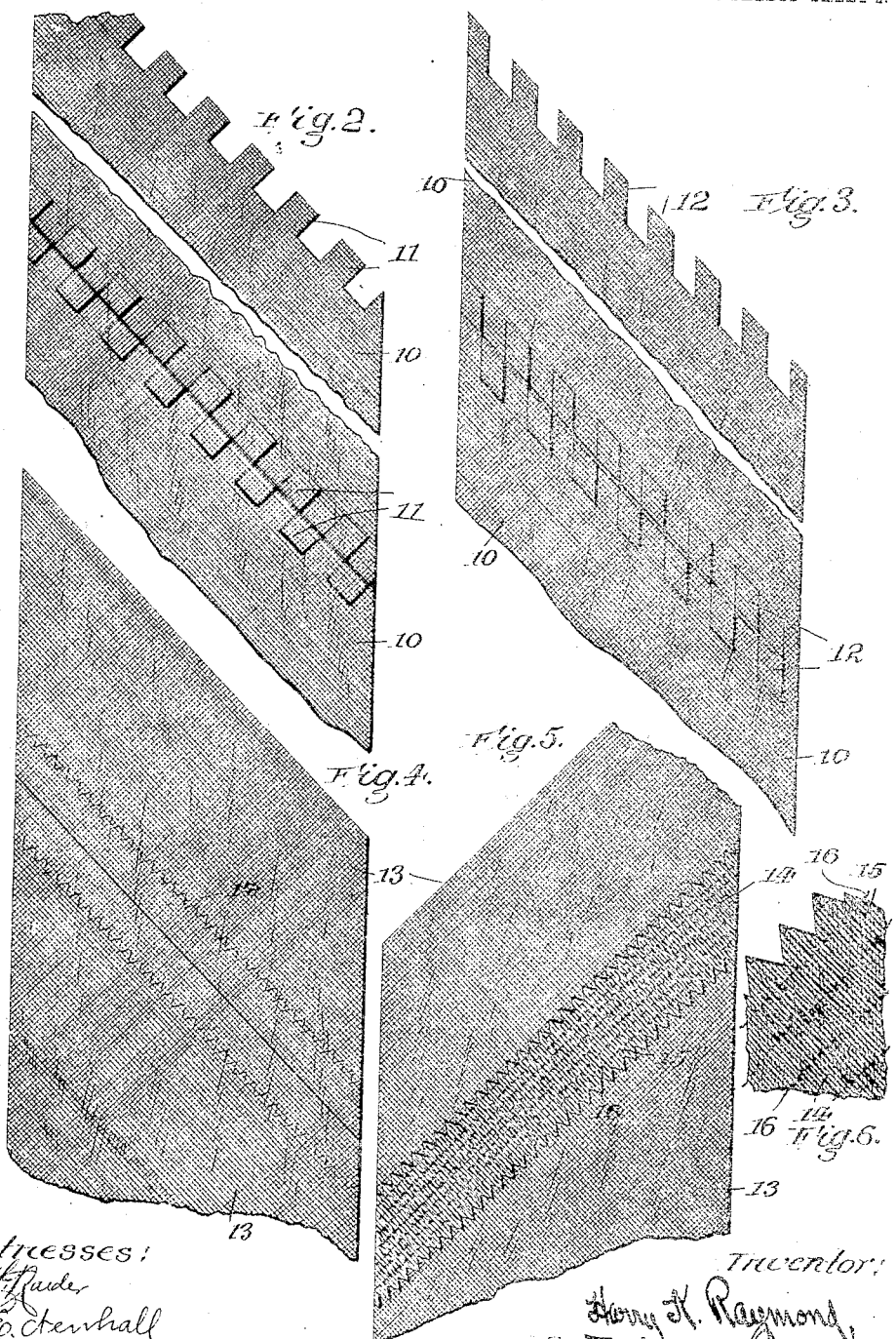

HARRY K. RAYMOND, OF AKRON, OHIO, ASSIGNOR, BY MESNE ASSIGNMENTS, TO THE B. F. GOODRICH COMPANY, A CORPORATION OF NEW YORK.

TIRE FABRIC.

1,043,143.  Specification of Letters Patent.  Patented Nov. 5, 1912.

Application filed July 15, 1910. Serial No. 572,213.

*To all whom it may concern:*

Be it known that I, HARRY K. RAYMOND, a citizen of the United States, residing at Akron, in the county of Summit and State of Ohio, have invented certain new and useful Improvements in Tire Fabrics, of which the following is a specification.

In the manufacture of tires it is desirable to stretch the fabric entering into the construction of such tires, both in order that the threads in the fabric may be brought into the position on the curved surface of the form that they should occupy in the completed tire, and in order that they may most effectively withstand the stresses to which the tire is subjected in use. As the tire fabric is flat when it is to be placed on the tire, and as it must be curved around the form and down its sloping sides, considerable shaping of the fabric is necessary in properly placing it on the form and in causing the threads of the fabric to assume their proper position. In order to secure the best results, this shaping should be uniform throughout all of the length of the fabric which is placed on the form in building up the tire; but one of the difficulties in securing this result is found in the fact that the strip of fabric is not a uniform, continuous one but is made up by joining together a number of comparatively short strips cut on the bias from a longer strip of fabric. The joints have been made by merely overlapping the ends of two of the fabric strips, but this results in making a stiff double layer of fabric and in preventing the fabric and the threads at the joint from being free to take the same position on the form as do the fabric and threads at the portions intermediate the joints, and a raised and weak spot on the tire is thus formed.

My invention consists in providing a flexible joint between the various fabric strips, specially capable of being shaped in substantial uniformity with the rest of the fabric.

I here show and describe various specific forms of such flexible joint as illustrations of some embodiments of my invention, but I do not limit myself to such forms, as equivalent constructions may be employed within the scope of my invention.

In the annexed drawings: Figure 1 is a plan view of portions of two sections of strips illustrating one embodiment of my invention; Figs. 2 and 3 are plan views, illustrating two other methods of accomplishing the end in view; Fig. 4 a similar view illustrating a still further method of producing the joint; Fig. 5 an inverted view of the fabric disclosed in Fig. 4; and Fig. 6 an enlarged detail of the securing band or member employed in the construction just mentioned.

Having reference to the construction shown in Fig. 1, 8, 8 denote two of the sections which are to be united in forming the strip, the sections usually being cut on the bias from a piece of woven cloth of any suitable texture, and, as is common, subjected to a coating of rubber, either before or after severance. The edges of the sections that are to be joined are then slitted or cut, as at 9, at short intervals, forming a series of tongues 9$^a$, and such edges are overlapped, the slits of one edge preferably alternating with those of the adjacent overlapping edge, as is clearly shown in Fig. 1. The warp and weft threads of the sections and, in fact, of the entire strip are on the bias, and by reason of the slits 9 it is found in actual practice that the joint is a flexible one, and the strip at the joint has substantially the same facility for being bellied, distended and shaped as have the other portions of the fabric, the various threads assuming their proper position upon the mandrel as the strip is laid up over or about the same, so that there results a uniform stretching and laying of the fabric and positioning of the strips throughout all of the fabric of the tire and in spite of the presence of numerous joints. In other words it may be said that the fabric at the joint is yielding in all directions.

In Fig. 2 each section 10 is shown as provided along each of its longer or diagonal edges with a series of tongues 11, the tongues being separated by a distance equal to the width of a tongue and extending outwardly at right angles to the edges upon which they are formed. The tongues upon the opposite edges of the sections are arranged in alternation or have a staggered relation, so that when the sections are assembled the tongues of one section will pass those of the adjacent section, the tongues overlying and adhering to the body of the adjacent section by reason of the rubber coating. Such connection will produce or allow of the requisite flexibility throughout the joint, while at the same time, as is true of the first-described construction, insuring sufficient strength longitudinally of the strip, so as not to part under the tension employed in laying the strip on the form, or when subjected to strains when the tire is in use.

A similar construction is disclosed in Fig. 3, the difference being that the tongues, designated by 12, extend in line with the longitudinal axis of the strip.

In Figs. 4 and 5 the edges of the sections 13 abut and are secured together by a flexible band or member 14, laid on one face of the sections and in line with and over the abutting edges thereof, said band being cemented in place. The band is preferably formed from a piece of fabric composed of a series of relatively soft threads 15, connected together by widely-separated small wrap threads 16, an enlarged section of such band being illustrated in Fig. 6. The securing band thus formed permits the rubber to readily permeate the same, and also insures a flexible and extensible joint between the adjacent bias members of the strip.

It will be seen that under all the various forms the threads of the sections or the strip as a whole maintain their bias relation or position and that the fabric and its threads at the joints between the various sections are flexible and capable of readily being shaped and laid on the form, so that as the strip is placed upon and made to conform to the mandrel, the threads take their proper set at the joint portions as well as in the other portions of the strips. Furthermore, the flexibility of the joints is such that no straight or abrupt ridge is produced in the tire, as is likely to result from a joint which is so inflexible as not to take the same set as the rest of the fabric.

Having thus described my invention, what I claim is:

1. As a new article of manufacture, a strip of woven, rubber-treated fabric composed of a plurality of sections, the adjacent edges of the various sections being flexibly connected to each other by a joint which is yielding in all directions, whereby the fabric and its threads at the joints may be shaped and set uniformly with the fabric and threads at other portions.

2. As a new article of manufacture, a strip of material composed of a plurality of sections of woven, rubber-treated cloth, flexibly secured together at their edges, the line of juncture between the sections extending across the strip diagonally to the longitudinal axis thereof, the strip at its joints being yielding in all directions.

3. As a new article of manufacture, a strip of woven, rubber-treated fabric composed of a plurality of bias sections, the adjacent edges of the various sections being flexibly connected to each other by a joint which is yielding in all directions, the joint between the sections extending diagonally to the longitudinal axis of the strip.

4. As a new article of manufacture, a strip of woven fabric composed of a plurality of bias sections, the transversely extending edges of each of said sections being provided with a series of tongues overlapping and secured to the adjacent section.

5. As a new article of manufacture, a strip of woven fabric composed of a plurality of bias sections, the transversely extending edges of each section being provided with a series of slits extending inwardly, the adjacent edges of the various sections being overlapped and secured to each other.

6. As a new article of manufacture, a strip of woven fabric composed of a plurality of bias sections, the adjacent edges of the various sections extending diagonally to the longitudinal axis of the strip, said edges being provided with a series of slits, the slits of one edge alternating with those in the adjacent overlapping edge of the adjacent section.

In testimony whereof I have signed my name to this specification in the presence of two subscribing witnesses.

HARRY K. RAYMOND.

Witnesses:
GEORGE A. SCANLON,
HERBERT W. CROYSDALE.